(12) United States Patent
Cassin et al.

(10) Patent No.: US 10,361,856 B2
(45) Date of Patent: Jul. 23, 2019

(54) UNIQUE TOKEN AUTHENTICATION CRYPTOGRAM

(71) Applicant: VISA INTERNATIONAL SERVICE ASSOCIATION, San Francisco, CA (US)

(72) Inventors: Michael Cassin, Foster City, CA (US); Christian Flurscheim, Walnut Creek, CA (US); Christopher Jones, Greenbrae, CA (US)

(73) Assignee: Visa International Service Association, San Francisco, CA (US)

( * ) Notice: Subject to any disclaimer, the term of this patent is extended or adjusted under 35 U.S.C. 154(b) by 102 days.

(21) Appl. No.: 15/632,223

(22) Filed: Jun. 23, 2017

(65) Prior Publication Data

US 2017/0373852 A1    Dec. 28, 2017

Related U.S. Application Data

(60) Provisional application No. 62/354,340, filed on Jun. 24, 2016.

(51) Int. Cl.
*H04L 9/00* (2006.01)
*H04L 9/32* (2006.01)
(Continued)

(52) U.S. Cl.
CPC ........... *H04L 9/3213* (2013.01); *G06Q 20/12* (2013.01); *G06Q 20/14* (2013.01);
(Continued)

(58) Field of Classification Search
CPC ......... H04L 9/3213; H04L 9/32; H04L 63/08; H04L 63/062; G06Q 20/3672; G06Q 20/385; G06Q 20/12
See application file for complete search history.

(56) References Cited

U.S. PATENT DOCUMENTS

| 5,280,527 A | 1/1994 | Gullman |
| 5,613,012 A | 3/1997 | Hoffman |

(Continued)

FOREIGN PATENT DOCUMENTS

| EP | 1028401 A2 | 8/2000 |
| EP | 2156397 A1 | 2/2010 |

(Continued)

OTHER PUBLICATIONS

PCT/US2017/039129, "PCT Search Report", dated Oct. 12, 2017, 15 pages.

(Continued)

*Primary Examiner* — Beemnet W Dada
(74) *Attorney, Agent, or Firm* — Kilpatrick Townsend & Stockton LLP

(57) ABSTRACT

Embodiments of the invention are directed to systems and methods for validating transactions using a cryptogram. One embodiment of the invention is directed to a method of processing a remote transaction initiated by a communication device provisioned with a token. The method comprises receiving, by a service provider computer, from an application on the communication device, a request for a token authentication cryptogram, wherein the token authentication cryptogram includes encrypted user exclusive data. The service provider computer may generate the token authentication cryptogram to include the user exclusive data. The service provider computer may send the token authentication cryptogram to the application, where the token authentication cryptogram can be used to validate the transaction, and the user exclusive data is extracted from the token authentication cryptogram during validation.

20 Claims, 7 Drawing Sheets

(51) Int. Cl.
   *G06Q 20/14* (2012.01)
   *H04L 29/06* (2006.01)
   *G06Q 20/12* (2012.01)
   *G06Q 20/36* (2012.01)
   *G06Q 20/38* (2012.01)

(52) U.S. Cl.
   CPC ..... *G06Q 20/3672* (2013.01); *G06Q 20/3674* (2013.01); *G06Q 20/385* (2013.01); *H04L 63/062* (2013.01); *H04L 63/08* (2013.01); *H04L 9/32* (2013.01)

(56) References Cited

U.S. PATENT DOCUMENTS

| | | | |
|---|---|---|---|
| 5,781,438 | A | 7/1998 | Lee |
| 5,883,810 | A | 3/1999 | Franklin |
| 5,930,767 | A | 7/1999 | Reber |
| 5,953,710 | A | 9/1999 | Fleming |
| 5,956,699 | A | 9/1999 | Wong |
| 6,000,832 | A | 12/1999 | Franklin |
| 6,014,635 | A | 1/2000 | Harris |
| 6,044,360 | A | 3/2000 | Picciallo |
| 6,163,771 | A | 12/2000 | Walker |
| 6,227,447 | B1 | 5/2001 | Campisano |
| 6,236,981 | B1 | 5/2001 | Hill |
| 6,267,292 | B1 | 7/2001 | Walker |
| 6,327,578 | B1 | 12/2001 | Linehan |
| 6,341,724 | B2 | 1/2002 | Campisano |
| 6,385,596 | B1 | 5/2002 | Wiser |
| 6,422,462 | B1 | 7/2002 | Cohen |
| 6,425,523 | B1 | 7/2002 | Shem Ur |
| 6,453,301 | B1 | 9/2002 | Niwa |
| 6,592,044 | B1 | 7/2003 | Wong |
| 6,636,833 | B1 | 10/2003 | Flitcroft |
| 6,748,367 | B1 | 6/2004 | Lee |
| 6,805,287 | B2 | 10/2004 | Bishop |
| 6,879,965 | B2 | 4/2005 | Fung |
| 6,891,953 | B1 | 5/2005 | DeMello |
| 6,901,387 | B2 | 5/2005 | Wells |
| 6,931,382 | B2 | 8/2005 | Laage |
| 6,938,019 | B1 | 8/2005 | Uzo |
| 6,941,285 | B2 | 9/2005 | Sarcanin |
| 6,980,670 | B1 | 12/2005 | Hoffman |
| 6,990,470 | B2 | 1/2006 | Hogan |
| 6,991,157 | B2 | 1/2006 | Bishop |
| 7,051,929 | B2 | 5/2006 | Li |
| 7,069,249 | B2 | 6/2006 | Stolfo |
| 7,103,576 | B2 | 9/2006 | Mann, III |
| 7,113,930 | B2 | 9/2006 | Eccles |
| 7,136,835 | B1 | 11/2006 | Flitcroft |
| 7,177,835 | B1 | 2/2007 | Walker |
| 7,177,848 | B2 | 2/2007 | Hogan |
| 7,194,437 | B1 | 3/2007 | Britto |
| 7,209,561 | B1 | 4/2007 | Shankar et al. |
| 7,264,154 | B2 | 9/2007 | Harris |
| 7,287,692 | B1 | 10/2007 | Patel |
| 7,292,999 | B2 | 11/2007 | Hobson |
| 7,350,230 | B2 | 3/2008 | Forrest |
| 7,353,382 | B2 | 4/2008 | Labrou |
| 7,379,919 | B2 | 5/2008 | Hogan |
| RE40,444 | E | 7/2008 | Linehan |
| 7,415,443 | B2 | 8/2008 | Hobson |
| 7,444,676 | B1 | 10/2008 | Asghari-Kamrani |
| 7,469,151 | B2 | 12/2008 | Khan |
| 7,548,889 | B2 | 6/2009 | Bhambri |
| 7,567,934 | B2 | 7/2009 | Flitcroft |
| 7,567,936 | B1 | 7/2009 | Peckover |
| 7,571,139 | B1 | 8/2009 | Giordano |
| 7,571,142 | B1 | 8/2009 | Flitcroft |
| 7,580,898 | B2 | 8/2009 | Brown |
| 7,584,153 | B2 | 9/2009 | Brown |
| 7,593,896 | B1 | 9/2009 | Flitcroft |
| 7,606,560 | B2 | 10/2009 | Labrou |
| 7,627,531 | B2 | 12/2009 | Breck |
| 7,627,895 | B2 | 12/2009 | Gifford |
| 7,650,314 | B1 | 1/2010 | Saunders |
| 7,685,037 | B2 | 3/2010 | Reiners |
| 7,702,578 | B2 | 4/2010 | Fung |
| 7,707,120 | B2 | 4/2010 | Dominguez |
| 7,712,655 | B2 | 5/2010 | Wong |
| 7,734,527 | B2 | 6/2010 | Uzo |
| 7,753,265 | B2 | 7/2010 | Harris |
| 7,770,789 | B2 | 8/2010 | Oder, II |
| 7,784,685 | B1 | 8/2010 | Hopkins, III |
| 7,793,851 | B2 | 9/2010 | Mullen |
| 7,801,826 | B2 | 9/2010 | Labrou |
| 7,805,376 | B2 | 9/2010 | Smith |
| 7,805,378 | B2 | 9/2010 | Berardi |
| 7,818,264 | B2 | 10/2010 | Hammad |
| 7,828,220 | B2 | 11/2010 | Mullen |
| 7,835,960 | B2 | 11/2010 | Breck |
| 7,841,523 | B2 | 11/2010 | Oder, II |
| 7,841,539 | B2 | 11/2010 | Hewton |
| 7,844,550 | B2 | 11/2010 | Walker |
| 7,848,980 | B2 | 12/2010 | Carlson |
| 7,849,020 | B2 | 12/2010 | Johnson |
| 7,853,529 | B1 | 12/2010 | Walker |
| 7,853,995 | B2 | 12/2010 | Chow |
| 7,865,414 | B2 | 1/2011 | Fung |
| 7,873,579 | B2 | 1/2011 | Hobson |
| 7,873,580 | B2 | 1/2011 | Hobson |
| 7,890,393 | B2 | 2/2011 | Talbert |
| 7,891,563 | B2 | 2/2011 | Oder, II |
| 7,896,238 | B2 | 3/2011 | Fein |
| 7,908,216 | B1 | 3/2011 | Davis et al. |
| 7,922,082 | B2 | 4/2011 | Muscato |
| 7,931,195 | B2 | 4/2011 | Mullen |
| 7,937,324 | B2 | 5/2011 | Patterson |
| 7,938,318 | B2 | 5/2011 | Fein |
| 7,954,705 | B2 | 6/2011 | Mullen |
| 7,959,076 | B1 | 6/2011 | Hopkins, III |
| 7,996,288 | B1 | 8/2011 | Stolfo |
| 8,025,223 | B2 | 9/2011 | Saunders |
| 8,046,256 | B2 | 10/2011 | Chien |
| 8,060,448 | B2 | 11/2011 | Jones |
| 8,060,449 | B1 | 11/2011 | Zhu |
| 8,074,877 | B2 | 12/2011 | Mullen |
| 8,074,879 | B2 | 12/2011 | Harris |
| 8,082,210 | B2 | 12/2011 | Hansen |
| 8,095,113 | B2 | 1/2012 | Kean |
| 8,104,679 | B2 | 1/2012 | Brown |
| RE43,157 | E | 2/2012 | Bishop |
| 8,109,436 | B1 | 2/2012 | Hopkins, III |
| 8,121,942 | B2 | 2/2012 | Carlson |
| 8,121,956 | B2 | 2/2012 | Carlson |
| 8,126,449 | B2 | 2/2012 | Beenau |
| 8,132,723 | B2 | 3/2012 | Hogg et al. |
| 8,171,525 | B1 | 5/2012 | Pelly |
| 8,175,973 | B2 | 5/2012 | Davis et al. |
| 8,190,523 | B2 | 5/2012 | Patterson |
| 8,196,813 | B2 | 6/2012 | Vadhri |
| 8,205,791 | B2 | 6/2012 | Randazza |
| 8,219,489 | B2 | 7/2012 | Patterson |
| 8,224,702 | B2 | 7/2012 | Mengerink |
| 8,225,385 | B2 | 7/2012 | Chow |
| 8,229,852 | B2 | 7/2012 | Carlson |
| 8,265,993 | B2 | 9/2012 | Chien |
| 8,280,777 | B2 | 10/2012 | Mengerink |
| 8,281,991 | B2 | 10/2012 | Wentker et al. |
| 8,328,095 | B2 | 12/2012 | Oder, II |
| 8,336,088 | B2 | 12/2012 | Raj et al. |
| 8,346,666 | B2 | 1/2013 | Lindelsee et al. |
| 8,376,225 | B1 | 2/2013 | Hopkins, III |
| 8,380,177 | B2 | 2/2013 | Laracey |
| 8,387,873 | B2 | 3/2013 | Saunders |
| 8,401,539 | B2 | 3/2013 | Beenau |
| 8,401,898 | B2 | 3/2013 | Chien |
| 8,402,555 | B2 | 3/2013 | Grecia |
| 8,403,211 | B2 | 3/2013 | Brooks |
| 8,412,623 | B2 | 4/2013 | Moon |
| 8,412,837 | B1 | 4/2013 | Emigh |
| 8,417,642 | B2 | 4/2013 | Oren |
| 8,447,699 | B2 | 5/2013 | Batada |
| 8,453,223 | B2 | 5/2013 | Svigals |

(56) References Cited

U.S. PATENT DOCUMENTS

| | | |
|---|---|---|
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,433,116 B2 | 9/2013 | Davis et al. |
| 8,528,067 B2 | 9/2013 | Hurry et al. |
| 8,533,860 B1 | 9/2013 | Grecia |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,751,642 B2 | 6/2014 | Vargas |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 9,646,303 B2 | 5/2017 | Karpenko |
| 9,680,942 B2 | 6/2017 | Dimmick |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0236632 A1 | 11/2004 | Maritzen |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0271847 A1 | 10/2009 | Karjala et al. |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |

(56) References Cited

U.S. PATENT DOCUMENTS

| | | |
|---|---|---|
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0124676 A1 | 5/2012 | Griffin et al. |
| 2012/0129514 A1 | 5/2012 | Beenau |
| 2012/0143754 A1 | 6/2012 | Patel |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder, II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191227 A1 | 7/2013 | Pasa et al. |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204790 A1 | 8/2013 | Agarwal et al. |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226802 A1 | 8/2013 | Hammad |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |

(56) References Cited

U.S. PATENT DOCUMENTS

| | | |
|---|---|---|
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346305 A1 | 12/2013 | Mendes |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0249945 A1 | 9/2014 | Gauthier |
| 2014/0294701 A1 | 10/2014 | Dai et al. |
| 2014/0297534 A1 | 10/2014 | Patterson |
| 2014/0310183 A1 | 10/2014 | Weber |
| 2014/0324690 A1 | 10/2014 | Allen et al. |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0081544 A1 | 3/2015 | Wong et al. |
| 2015/0082407 A1 | 3/2015 | Galpin et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0188907 A1* | 7/2015 | Khalid ............ H04L 63/0815 726/8 |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0278799 A1 | 10/2015 | Palanisamy |
| 2015/0287037 A1 | 10/2015 | Salmon |
| 2015/0312038 A1 | 10/2015 | Palanisamy |
| 2015/0319158 A1 | 11/2015 | Kumnick |
| 2015/0324736 A1 | 11/2015 | Sheets |
| 2015/0332262 A1 | 11/2015 | Lingappa |
| 2015/0356560 A1 | 12/2015 | Shastry et al. |
| 2015/0363781 A1 | 12/2015 | Badenhorst |
| 2016/0028550 A1 | 1/2016 | Gaddam et al. |
| 2016/0036790 A1 | 2/2016 | Shastry |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0092874 A1 | 3/2016 | O'Regan |
| 2016/0103675 A1 | 4/2016 | Aabye et al. |
| 2016/0119296 A1 | 4/2016 | Laxminarayanan et al. |
| 2016/0132878 A1 | 5/2016 | O'Regan |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0197725 A1 | 7/2016 | Hammad |
| 2016/0210628 A1 | 7/2016 | McGuire |
| 2016/0217461 A1 | 7/2016 | Gaddam |
| 2016/0218875 A1 | 7/2016 | Le Saint et al. |
| 2016/0224976 A1 | 8/2016 | Basu |
| 2016/0224977 A1 | 8/2016 | Sabba et al. |
| 2016/0232527 A1 | 8/2016 | Patterson |
| 2016/0239842 A1 | 8/2016 | Cash et al. |
| 2016/0259936 A1* | 9/2016 | Mukherjee ............ G06F 21/45 |
| 2016/0269391 A1 | 9/2016 | Gaddam et al. |
| 2016/0308995 A1 | 10/2016 | Youdale et al. |
| 2017/0046696 A1 | 2/2017 | Powell et al. |
| 2017/0076288 A1 | 3/2017 | Awasthi |
| 2017/0103387 A1 | 4/2017 | Weber |
| 2017/0109745 A1 | 4/2017 | Al-Bedaiwi |
| 2017/0148013 A1 | 5/2017 | Rajurkar |
| 2017/0163617 A1 | 6/2017 | Narayan |
| 2017/0163629 A1 | 6/2017 | Law |
| 2017/0186001 A1 | 6/2017 | Reed et al. |
| 2017/0200156 A1 | 7/2017 | Karpenko |
| 2017/0200165 A1 | 7/2017 | Narayan |
| 2017/0201520 A1 | 7/2017 | Chandoor |
| 2017/0220818 A1 | 8/2017 | Nagasundaram et al. |
| 2017/0221054 A1 | 8/2017 | Flurscheim |
| 2017/0221056 A1 | 8/2017 | Karpenko |
| 2017/0228723 A1 | 8/2017 | Taylor et al. |
| 2017/0236113 A1 | 8/2017 | Chitalia |
| 2017/0293914 A1 | 10/2017 | Girish |
| 2017/0295155 A1 | 10/2017 | Wong et al. |
| 2017/0364903 A1 | 12/2017 | Lopez |
| 2018/0006821 A1 | 1/2018 | Kinagi |
| 2018/0075081 A1 | 3/2018 | Chipman |
| 2018/0247303 A1 | 8/2018 | Raj |
| 2018/0262334 A1 | 9/2018 | Hammad |
| 2018/0268399 A1 | 9/2018 | Spector |
| 2018/0268405 A1 | 9/2018 | Lopez |
| 2018/0285875 A1 | 10/2018 | Law |
| 2018/0324184 A1 | 11/2018 | Kaja |
| 2018/0324584 A1 | 11/2018 | Lopez |
| 2019/0020478 A1 | 1/2019 | Girish |
| 2019/0066069 A1 | 2/2019 | Faith |

FOREIGN PATENT DOCUMENTS

| | | |
|---|---|---|
| WO | 2000/014648 A1 | 3/2000 |
| WO | 2001035304 A1 | 5/2001 |
| WO | 2001035304 A9 | 5/2001 |
| WO | 2004/051585 A2 | 11/2003 |
| WO | 2004042536 A2 | 5/2004 |
| WO | 2005/001751 A1 | 6/2004 |

(56) References Cited

FOREIGN PATENT DOCUMENTS

| WO | 2006113834 A2 | 10/2006 |
|---|---|---|
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

Petition for Inter Partes Review of U.S. Pat. No. 8,533,860 Challenging Claims 130 Under 35 U.S.C. § 312 and 37 C.F.R. § 42.104, filed Feb. 17, 2016, Before the USPTO Patent Trial and Appeal Board, IPR 2016-00600, 65 pages.

Wang, et. al, U.S. Appl. No. 16/302,054 (unpublished), "Methods of Distributing Tokens and Managing Token Relationships," filed Nov. 15, 2018.

Dean, et al., U.S. Appl. No. 16/311,144 (unpublished), "Encryption Key Exhange Process Using Access Device," filed Dec. 18, 2018.

Purves, et al., U.S. Appl. No. 16/287,244 (unpublished), "Payment Channel Returning Limited Use Proxy Dynamic Value," filed Feb. 27, 2019.

* cited by examiner

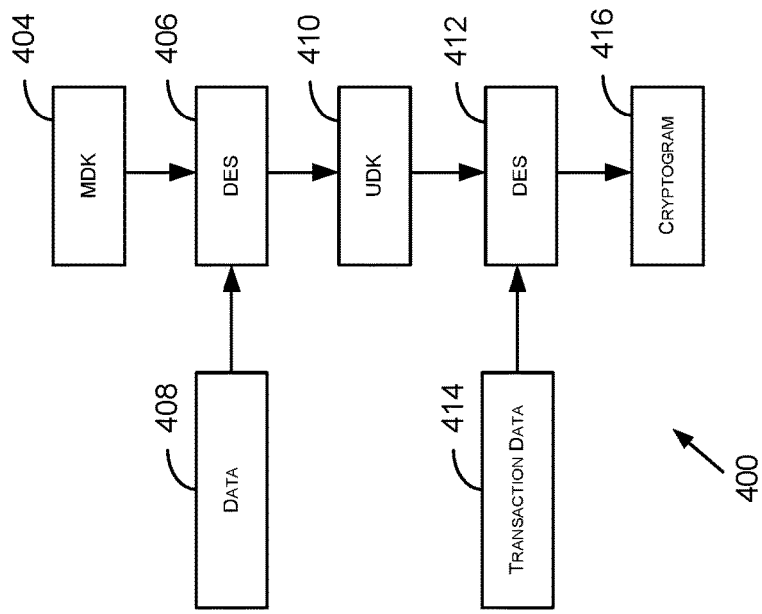

| Field Name | Length | Format | Description |
|---|---|---|---|
| Application Transaction Counter | 2 | Binary | A number of transactions performed |
| Token Requestor ID | 6 | Binary | An identifier for the token requestor |
| ECI Indicator | 1 | BCD | Transaction Type Indicator |
| Local CVM | 1 | Binary | Local Verification Method |
| ATN | 2 | BCD | Automatic Transaction Number |
| User Exclusive Data | Defined by Service Provider | Binary | Defined by Service Provider. |

FIG. 4

UNIQUE TOKEN AUTHENTICATION CRYPTOGRAM

CROSS-REFERENCE TO RELATED APPLICATIONS

This application is a non-provisional application of, and claims the benefit of the filing date of, U.S. Provisional Application No. 62/354,340, filed on Jun. 24, 2016, which is herein incorporated by reference in its entirety for all purposes.

BACKGROUND

Embodiments of the invention are directed to systems and methods related to authentication a user performing a transaction.

The Internet has made it increasingly easy for users to conduct electronic transactions using computing devices such as mobile devices (e.g., mobile phones, tablet computers). However, it has also increased the risks of fraudulent transactions, as well as the risk of data being compromised. Transactions conducted over the Internet, using a website hosted by a resource provider or a mobile application, can make it difficult for a resource provider or transaction processing entity to know whether the user conducting the transaction is actually the user he purports to be. Thus, systems have been established to perform authentication processing.

In current solutions, when a user conducts a transaction with a resource provider that uses a secure authentication system, the user includes a previously generated cryptogram with the transaction. The cryptogram is typically generated and provisioned to the user by a token generation service. This is meant to ensure that the person engaging in the transaction is authenticated.

This process has several drawbacks. One drawback is that the cryptogram generation procedure creates friction in the transaction process due to the cryptogram being generated by a separate system from the transaction requestor. This also causes the requestor to be dependent on another system in order to conduct a transaction. Another drawback is that, in current solutions, the cryptogram is generated based a predefined rules over which the requestor has no influence. Additionally, cryptograms are utilized in traditional systems merely as an authentication tool.

Thus, there is a need for new and enhanced methods of performing an authentication process for a transaction that utilizes a secure authentication infrastructure and that are more efficient and/or provide greater flexibility in the authentication process.

Embodiments of the invention address these and other problems, individually and collectively.

BRIEF SUMMARY

One embodiment of the invention is directed to a method of processing a transaction initiated by a communication device provisioned with a token. The method comprises receiving, by a service provider computer, from an application operating on the communication device, a token request message for a token authentication cryptogram, wherein the token authentication cryptogram includes encrypted user exclusive data. The method further comprises generating, by the service provider computer, the token authentication cryptogram derived from the user exclusive data. The method further comprises sending, by the service provider computer to the application, the token authentication cryptogram, wherein the token authentication cryptogram can be used to validate the transaction, and the user exclusive data is extracted from the token authentication cryptogram during validation.

Another embodiment of the invention is directed to a method of processing a remote transaction initiated by a communication device. The method comprises sending, by a service provider, to a token provider computer, a token request message for a token authentication cryptogram, wherein the token request message comprises user exclusive data. The method further comprises receiving, by the service provider, from the token provider computer, a token and a token authentication cryptogram, the token authentication cryptogram derived from the user exclusive data. The method further comprises sending, by the service provider to the communication device, the token and the token authentication cryptogram, wherein the token authentication cryptogram can be used to validate the transaction, and the user exclusive data is extracted from the token authentication cryptogram during validation.

Another embodiment of the invention is directed to a service provider computer comprising, a processor, and a computer readable medium coupled to the processor. The computer readable medium may comprise code for causing the processor to perform operations. The operations comprise sending, to a server computer, a request for a token authentication cryptogram, wherein the request comprises user exclusive data. The operations further comprise receiving, from the server computer, a token and a token authentication cryptogram derived from the user exclusive data. The operation further comprise sending, to an application operating on a user device, the token and the token authentication cryptogram with transaction data, wherein the token authentication cryptogram can be used to validate the transaction data, and the user exclusive data is extracted from the token authentication cryptogram during validation. In some embodiments, the authentication cryptogram can be decrypted with an appropriate cryptographic key to extract the user exclusive data.

BRIEF DESCRIPTION OF THE DRAWINGS

FIG. 4 shows data elements that may be used to create a token authentication cryptogram and a flowchart illustrating a process for creating the cryptogram according to an embodiment of the invention.

DETAILED DESCRIPTION

Figure 1:
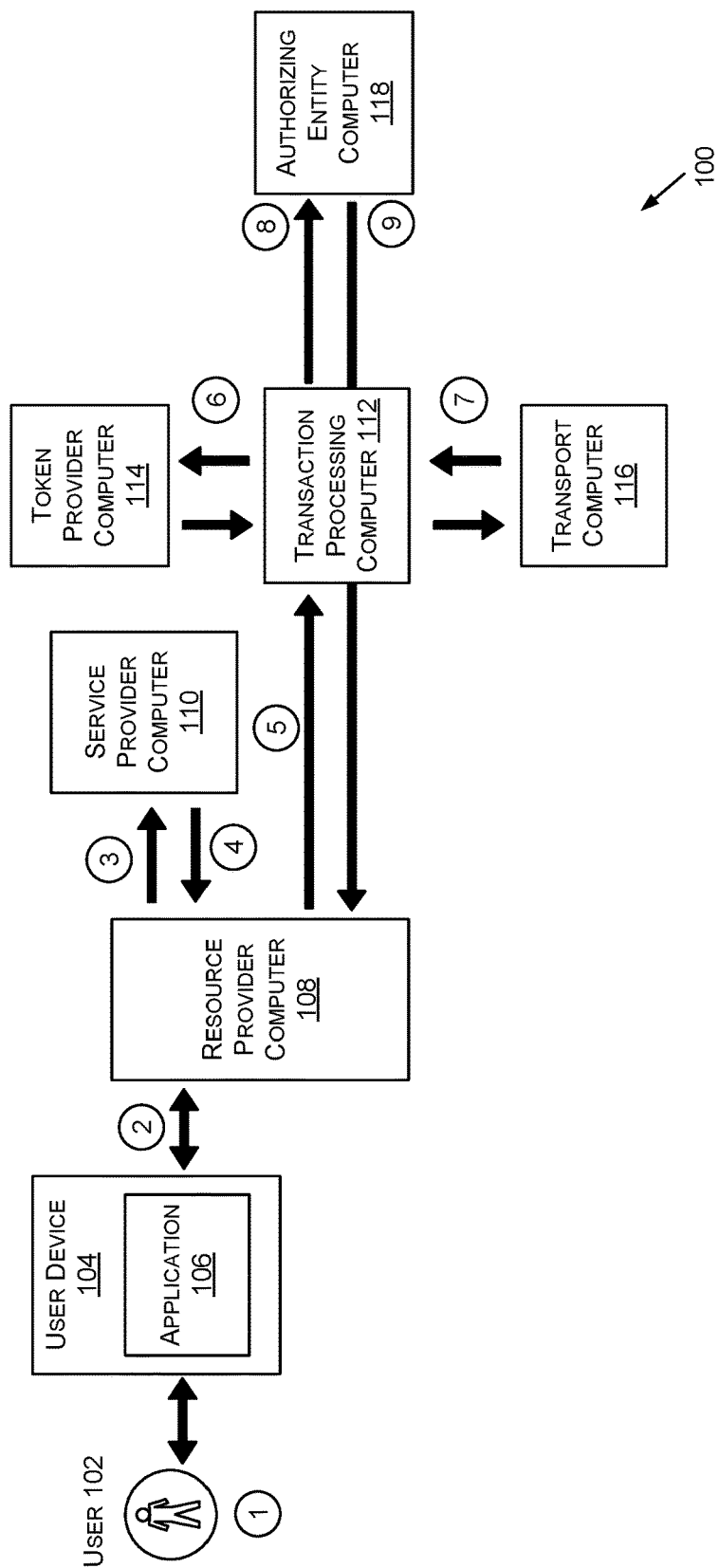
FIG. 1 shows a block diagram of a system for performing a transaction using a communication device provisioned with a token according to an embodiment of the invention.

Prior to discussing specific embodiments of the invention, some terms may be described in detail.

A "communication device" may include any suitable device that can allow for communication with an external entity. A communication device may be a mobile device if the mobile device has the ability to communicate data to and from an external entity.

A "mobile device" may comprise any suitable electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile devices include mobile phones (e.g. cellular phones), PDAs, tablet computers, net books, laptop computers, personal music players, hand-held specialized readers, etc. Further examples of mobile devices include wearable devices, such as smart watches, fitness bands, ankle bracelets, rings, earrings, etc., as well as automobiles with remote communication capabilities. A mobile device may comprise any suitable hardware and software for performing such functions, and may also include multiple devices or components (e.g. when a device has remote access to a network by tethering to another device—i.e. using the other device as a modem—both devices taken together may be considered a single mobile device).

A "payment device" may include any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A payment device may be associated with a value such as a monetary value, a discount, or store credit, and a payment device may be associated with an entity such as a bank, a merchant, a payment processing network, or a person. A payment device may be used to make a payment transaction. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc. Other examples of mobile devices include pagers, payment cards, security cards, access cards, smart media, transponders, and the like. If the payment device is in the form of a debit, credit, or smartcard, the payment device may also optionally have features such as magnetic stripes. Such devices can operate in either a contact or contactless mode. In some embodiments, a mobile device can function as a payment device (e.g., a mobile device can store and be able to transmit payment credentials for a transaction).

A "credential" may be any suitable information that serves as reliable evidence of worth, ownership, identity, or authority. A credential may be a string of numbers, letters, or any other suitable characters, as well as any object or document that can serve as confirmation. Examples of credentials include identification cards, certified documents, access cards, passcodes and other login information, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided in order to make a payment from a payment account. Payment credentials can also include a user name, an expiration date, a gift card number or code, and any other suitable information.

An "application" may be computer code or other data stored on a computer readable medium (e.g. memory element or secure element) that may be executable by a processor to complete a task.

A "digital wallet" can include an electronic device that allows an individual to conduct electronic commerce transactions. A digital wallet may store user profile information, payment credentials, bank account information, one or more digital wallet identifiers, one or more tokens specific to the individual and/or electronic device, one or more token authentication cryptograms (TACs) specific to the individual and/or the electronic device, and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. A digital wallet may be designed to streamline the purchase and payment process. A digital wallet may allow the user to load one or more payment cards onto the digital wallet so as to make a payment without having to enter an account number or present a physical card.

A "service provider computer" may include an entity, (e.g., a merchant, an issuing bank or third party), that provides a service (e.g., a digital wallet) to a user that enables the user to conduct financial transactions. In some embodiments, a service provider computer may also be referred to as a "digital wallet provider." A service provider computer may provide standalone user-facing software applications that store account numbers, or representations of the account numbers (e.g., token(s)), on behalf of a cardholder (or other user) to facilitate transactions at more than one unrelated entity (e.g., merchant), perform person-to-person payments, or load financial value into the digital wallet. A service provider computer may enable a user to access its account via a personal computer, mobile device, or access device. Additionally, a service provider computer may also provide one or more of the following functions: generating a token authentication cryptogram (TAC), storing multiple payment cards and other payment products on behalf of a user, storing other information including billing address, shipping addresses, and transaction history, initiating a transaction by one or more methods, such as providing a user name and password, near field communication (NFC) or a physical token, and may facilitate pass-through or two-step transactions.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "token authentication cryptogram" (TAC) may be a value used for authenticating a token. A TAC may be a string of numbers, letters, or any other suitable characters, of any suitable length. In some embodiments, a TAC may include encrypted user exclusive data (e.g., a merchant identifier associated with a transaction associated with a user, a name of the user, the user's preferences, address, age, or any suitable information related to a user). In some embodiments, the TAC may be generated using a token and user exclusive data such that the same TAC may be used to validate the token as well as to extract user exclusive data from the TAC.

"User exclusive data" may include any suitable data pertinent to a user. Examples of user exclusive data may include a name of the user, a phone number of the user, user preferences (e.g., whether alerts or receipts are to be provided to the user), user transaction histories, etc.

"Tokenization," also known as a "token exchange," is a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other information that may be replaced with a substitute value (i.e., token). Tokenization may be used to enhance transaction efficiency, improve transaction security, increase service transparency, or to provide a method for third-party enablement.

A "token provider computer" can include an electronic device that services payment tokens and/or cryptograms (e.g., TACs). In some embodiments, a token provider computer can facilitate requesting, determining (e.g., generating) and/or issuing (provisioning, transmitting, etc.) tokens and/or cryptograms, as well as maintaining an established mapping of tokens to primary account numbers (PANs) and/or cryptograms in a repository. In some embodiments, the token provider computer may establish a token assurance level for a given token to indicate the confidence level of the token to PAN binding. The token provider computer may include or be in communication with a token data store wherein the generated tokens/TACs are stored. The token provider computer may support token processing of payment transactions submitted using tokens by de-tokenizing the token to obtain the actual PAN. In some embodiments, a token provider computer may include a tokenization computer alone, or in combination with other computers such as a transaction processing computer. Various entities of a tokenization ecosystem may assume the roles of the token provider computer. For example, payment networks and issuers or their agents may become the token provider computer by implementing the token services according to embodiments of the present invention.

A "token request message" may be an electronic message for requesting a token and/or a TAC. A token request message may include information usable for identifying a payment account or a service provider account (e.g., a digital wallet account), and/or information for generating a token (e.g., a payment token) and/or a unique cryptogram (a TAC). For example, a token request message may include payment credentials, mobile device identification information (e.g. a phone number or MSISDN), a service provider identifier (e.g., an identifier for a service provider that provides a digital wallet), information identifying a token provider computer, a resource provider identifier (e.g., a merchant identifier), and/or any other suitable information. Information included in a token request message can be encrypted (e.g., with a service provider specific key).

A "token response message" may be a message that responds to a token request message. A token response message may include an indication that a token request was approved or denied. A token response message may also include a token (e.g., a payment token), a cryptogram (e.g., a TAC), user device identification information (e.g. a phone number or MSISDN), a service provider identifier (e.g., an identifier for a service provider that provides a digital wallet), a resource provider identifier (e.g., a merchant identifier), and/or any other suitable information. Information included in a token response message can be encrypted (e.g., with an issuer-specific key).

A "user" may include an individual. In some embodiments, a user may be associated with one or more personal accounts and/or user devices. The user may also be referred to as a cardholder, account holder, or consumer.

A "resource provider" may be an entity that can provide a resource such as goods, services, information, and/or access. Examples of resource providers include merchants, access devices, secure data access points, etc. A "merchant" may typically be an entity that engages in transactions and can sell goods or services, or provide access to goods or services.

A "resource provider computer" may be any communication device operated by, or on behalf of, of a resource provider. A resource provider computer may host an application running on a user device. A "user device" may include any suitable communication device and/or mobile device operated by or on behalf of a user. The resource provider may be in communication with one or more service provider computers and/or one or more transaction processing computers. The resource provider computer may provide one or more interfaces (e.g., via a website and/or application) with which a user may perform any suitable transaction (e.g., a payment transaction).

An "acquirer" may typically be an entity (e.g., a commercial bank) that has a business relationship with a particular resource provider (e.g., a merchant) or other entity. Some entities can perform both issuer and acquirer functions. Some embodiments may encompass such single entity issuer-acquirers. An acquirer may operate an acquirer computer, which can also be generically referred to as a "transport computer."

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer.

An "access device" may be any suitable device that provides access to a remote system. An access device may also be used for communicating with a resource provider computer, a service provider computer, a transaction processing computer, or any other suitable device and/or system. An access device may generally be located in any suitable location, such as at the location of a resource provider (e.g., a merchant). An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant calls the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization. As noted above, in some embodiments, a transaction processing computer may generate or forward the authorization response message to the merchant.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

With the widespread use of smart phones and other application-based communication devices, users (e.g., consumers) are increasingly looking to conduct transactions (e.g., payment transactions) using applications on their user devices. As a non-limiting example, an application may be provided by a resource provider computer (e.g., a merchant) that allows a user to conduct a transaction (e.g., a payment transaction) utilizing a digital wallet (e.g., one provided by a service provider). In order to conduct a secure transaction using these applications, tokens may be used in place of sensitive account data (e.g., a PAN). The validation of these tokens may be performed using unique cryptograms (e.g., TACs). TACs may include encrypted values that can be generated by the creator of a token and then later decrypted (e.g., by a transaction processing computer, a transport computer, an authorizing computer, etc.). The decrypting computer can then forward an authorization request message to an authorizing entity (e.g., an issuer), who can then authorize the transaction.

Traditionally, a service provider computer may be dependent upon a token provider computer for the management of tokens/cryptograms and their content. This can be a problematic, as the service provider may want to create its own tokens and/or token authentication cryptograms. Additionally, some service providers may desire to communicate to transport and/or authorizing entities (or any suitable computer and/or entity in the systems discussed herein) additional information such as the merchant involved in the transaction, a wallet identifier (ID), etc. Conventionally, service provider computers do not transmit such information. Accordingly, there is a need for a method of validating a transaction using a token authentication cryptogram (TAC) as discussed herein.

Embodiments of the present invention address these problems and other problems individually and collectively.

FIG. 1 shows a block diagram of a system 100 for performing a transaction using a communication device (e.g., user device 104) provisioned with a token according to an embodiment of the invention. The system 100 includes a user device 104 (e.g., a user device associated with user 102), a resource provider computer 108, a service provider computer 110, a transaction processing computer 112, a transport computer 116, a token provider computer 114, and an authorizing entity computer 118. Each of these systems and computers may be in operative communication with each other. For simplicity of illustration, a certain number of components are shown in FIG. 1. However, it should be appreciated that embodiments of the invention may include more than one of each component. In addition, some embodiments of the invention may include fewer than or greater than all of the components shown in FIG. 1. In addition, the components in FIG. 1 may communicate via any suitable communication medium using any suitable communications protocol.

Suitable communications medium may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the components of FIG. 1 may be transmitted using a communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

User device 104, an example of a communication device, may be in any suitable form. Examples of user device 104 may include any device capable of accessing the Internet, such as a personal computer, cellular or wireless phones, personal digital assistants (PDAs), tablet computers, laptop computers, and handheld specialized readers.

User device 104 may include a processor and a computer readable medium coupled to the processor, the computer readable medium comprising code, executable by the processor for performing the functionality described herein. User device 104 may be communicatively coupled to the resource provider computer 108 via a communications medium in order to conduct a transaction with a resource provider (e.g., a merchant) associated with the resource provider computer 108. In some embodiments, the user device 104 may be in communications with resource provider computer 108 through application 106. The application 106 may be stored in a memory element of user device 104 and may be configured to retrieve, present, and send data across a communications network (e.g., the Internet) to and/or from resource provider computer 108. In some embodiments, user device 104 may be communicatively coupled to service provider computer 110.

Resource provider computer 108 may include any suitable computational apparatus operated by a resource provider (e.g., a merchant). The resource provider computer 108 may include a processor and a computer readable medium coupled to the processor, the computer readable medium comprising code, executable by the processor for performing the functionality described herein. Examples of resource provider computer 108 may include an access device or a point of sale device. In some embodiments, the resource provider computer 108 may include a web server computer that may host one or more websites associated with the resource provider. In some embodiments, the resource provider computer 108 may be configured to send/receive data (e.g., a token request message, a token response message, etc.) to/from the service provider computer 110 and/or token provider computer 114. In some embodiments, the resource provider computer 108 may also be configured to send/receive data (e.g., an authorization request message, an authorization response message, etc.) to/from the transaction processing computer 112.

Service provider computer 110 may include any suitable computational apparatus operated by a service provider (e.g., a digital wallet provider). The service provider computer 110 may include a processor and a computer readable medium coupled to the processor, the computer readable medium comprising code, executable by the processor for performing the functionality described herein. In some embodiments, the service provider computer 110 may be configured to send/receive data to/from user device 104, resource provider computer 108 and/or token provider computer 114. In some examples, service provider computer 110 may be configured to generate/maintain a token and/or a TAC associated with a user (e.g., user 102). The TAC may be generated from user exclusive data associated with the user.

Transaction processing computer 112 may be a network that includes or operates at least one server computer used for transaction processing. Transaction processing computer 112 may include a processor and a computer readable medium coupled to the processor, the computer readable medium comprising code, executable by the processor for performing the functionality described herein. Transaction processing computer 112 may include data processing subsystems, networks, and operations used to support and deliver authorization services, exception file services, and clearing and settlement services. An exemplary transaction processing computer 112 may include a network (e.g., VisaNet™) that is able to process credit card transactions, debit card transactions, and other types of commercial transactions. In particular, transaction processing computer 112 may be part of an integrated payments system (Integrated Payments system) which processes authorization requests and a Base II system, which performs clearing and settlement services. In the example depicted in FIG. 1 transaction processing computer 112 may provide transaction authorization and clearing and settlement services between the transport computer 116 and the authorizing entity computer 118 for standard payment transactions. In some embodiments, the transaction processing computer 112 may be configured to send/receive data to/from resource provider computer 108, token provider computer 114, and/or authorizing entity computer 118. In some embodiments, the transaction processing computer 112 may be configured to extract user exclusive data from a received TAC (e.g., a TAC received in an authorization request message).

Token provider computer 114 may include any suitable computational apparatus operated by a token provider. Token provider computer 114 may include a processor and a computer readable medium coupled to the processor, the computer readable medium comprising code, executable by the processor for performing the functionality described herein. Token provider computer 114 can facilitate requesting, determining (e.g., generating) and/or issuing (provisioning, transmitting, etc.) tokens and/or TACs, as well as maintaining an established mapping of tokens to information associated with a user (e.g., a PAN, a TAC, etc.) in a repository (e.g. token vault). The token provider computer 114 may include or be in communication with a token vault (e.g., one or more data stores) where the generated tokens and/or TACs are stored. The token provider computer 114 may support token processing of transactions submitted using tokens by de-tokenizing the token to obtain underlying data (e.g., the PAN). In some embodiments, the token provider computer 114 may be configured to extract user exclusive data from a received TAC (e.g., a TAC received in an authorization request message). In some embodiments, the token provider computer 114 may be configured to send/receive data to/from service provider computer 110 and/or transaction processing computer 112.

Transport computer 116 may be associated with a business entity (e.g., a commercial bank) that has a business relationship with a particular resource provider (e.g., a merchant) or other entity and that may be involved in the process of transaction. The transport computer 116 may issue and manage accounts for resource providers and exchange funds with the authorizing entity computer 118 on behalf of the resource provider. Some entities can perform both transport computer 116 and authorizing entity computer 118 functions. Embodiments of the present invention encompass such single entity transport/authorizing entity computers. In some embodiments, transport computer 116 may be configured to extract user exclusive data from a TAC received in a message (e.g., an authorization request message). In some embodiments, transport computer 116 may be configured to send/receive data to/from transaction processing computer 112. In some embodiments, the transport computer 116 may be configured to extract user exclusive data from a received TAC (e.g., a TAC received in an authorization request message or another message).

Authorizing entity computer 118 is typically associated with a business entity (e.g., a bank) which issues and maintains user accounts for a user (e.g., a consumer). The authorizing entity may issue payment devices for a user account (e.g., a consumer account), including credit cards and debit cards, and/or may provide user accounts stored and accessible via the user device 104. In some embodiments, authorizing entity computer 118 may be configured to extract user exclusive data from a TAC received in a message (e.g., an authorization request message). In some embodiments, authorizing entity computer 118 may be configured to send/receive data to/from transaction processing computer 112. In some embodiments, the authorizing entity computer 118 may be configured to extract user exclusive data from a received TAC (e.g., a TAC received in an authorization request message or another message).

In the example provided in FIG. 1, user 102 may utilize user device 104 to conduct transactions with a resource provider (e.g., a merchant) associated with the resource provider computer 108. User device 104 may be configured to store information (e.g., user specific information, etc.) associated with the user 102. For example, user specific information may include payment credentials, a token (e.g., a payment token) and/or personal information such as a name, address, email address, phone number, or any other suitable data associated with user 102. The user device 104 may provide this user specific information to resource provider computer 108 during a transaction.

In one non-limiting example, user 102 (e.g., a consumer) may wish to conduct a transaction (e.g., a payment transaction) using user device 104. By way of example, the user device 104 may be a smart phone and the user 102 may wish to conduct the transaction with resource provider computer 108 remotely, i.e. from a location that is not within a store associated with the same resource provider as resource provider computer 108.

At step 1, user 102 may provision user device 104 with a token (e.g., a token generated by token provider computer 114). The user device 104 may have been provisioned with the token using an application (e.g., application 106) that has been stored on the memory of the user device 104 such as either a mobile banking application provided by authorizing entity computer 118, a digital wallet application provided by service provider computer 110, an e-commerce application provided by the resource provider computer 108, etc. During provisioning, or at another suitable time, the service provider computer 110 may obtain and/or generate a set of user exclusive data that is unique to user 102. User exclusive data may include any suitable data pertaining to a user, such as a resource provider identifier for a resource provider (e.g., a merchant) involved in the transaction, a wallet ID, user preferences, user specific data such as phone numbers and e-mail addresses, etc.

Once user 102 has provisioned his or her communication device (e.g., the user device 104) with a token (e.g., a token generated by token provider computer 114 or service provider computer 110), he or she may now use the user device 104 to initiate a transaction. User 102 may then open the application 106 that is stored on the memory of the user device 104. In some embodiments, application 106 (in this case hosted by the resource provider computer 108) may allow user 102 to view items that a resource provider (e.g., a merchant) sells.

At step 2, items offered for consumption may be displayed by application 106 to user 102, and user 102 may select which items he or she would like to procure (e.g., purchase, lease, borrow, etc.). Once the user 102 has finished making his or her selections, he or she may proceed to checkout.

Once a user 102 proceeds to checkout, application 106 may initiate a request (e.g., a token request message) that is communicated to service provider computer 110 at step 3. The request may cause the service provider computer 110 to generate a unique cryptogram (e.g., a TAC) that may be used to validate the transaction (e.g., by validating the token included in the transaction). An encryption key, such as a symmetric encryption key, may be used to encrypt a number of data elements including user exclusive data to form the TAC. The encryption key may be known or derivable by the token provider computer 114, the transaction processing computer 112, the transport computer 116, and/or the authorizing entity computer 118.

The request (e.g., the token request message) may be communicated to the service provider computer 110 via resource provider computer 108 and/or directly from application 106. The TAC generated by service provider computer 110 may be derived from a token and user exclusive data that were previously stored or obtained (e.g., from the token request message) by service provider computer 110. At step 4, service provider computer 110 may send the TAC to application 106 (e.g., via resource provider computer 108 or directly to user device 104).

The resource provider computer 108 may have obtained the user's token from either the user device 104 or the service provider computer 110. In some embodiments, the token may be stored at the service provider computer 110 and may be sent to the resource provider computer 110 (e.g., along with the TAC). In other embodiments, the token may be stored in the user device 104, and it may be provided to the resource provider computer 108.

At step 5, once the resource provider computer 108 has the token and the TAC, the resource provider computer 108 may package the token and the TAC into a message (e.g., an authorization request message) and may send the message to a transaction processing computer 112. Alternatively, the application 106 may package the token and/or TAC and communicate an authorization request message on its own.

At step 6, transaction processing computer 112 may receive the message (e.g., an authorization request message) containing the token and TAC and may send the message to the token provider computer 114. Token provider computer 114 may be configured to exchange the token with account information (e.g., a PAN) belonging to user 102 so that the transaction may be processed. In some embodiments, transaction processing computer 112 may be configured to validate the transaction by validating the token provided using the TAC. The transaction processing computer 112 may additionally, or alternatively, extract user exclusive data from the TAC. The extracted user exclusive data may be used for any suitable purpose.

The transaction processing computer 112 can use the TAC to validate that the token being used is appropriate for the type of transaction being conducted. For example, a token may have been generated such that the token provider computer 114 and the transaction processing computer 112 can ascertain that that token is only to be used in a particular transaction mode. The particular transaction mode may be an e-commerce transaction mode, as opposed to a transaction being conducted at a physical point of sale. Thus, if a transaction conducted using the token is being used at a physical point of sale and the TAC that accompanies the token is only valid for e-commerce transactions, then the transaction processing computer 112 may decline the transaction because the token is not being used in a valid manner.

The transaction processing computer 112 may use the user exclusive data in any suitable manner. For example, the transaction processing computer 112 (and/or the token provider computer, the transport computer, or the authorizing entity computer) may have a cryptographic key that will allow it to decrypt the TAC and obtain encrypted user exclusive data such as the user's name and address. Such information could be used in an additional fraud analysis conducted by the transaction processing computer 112 to determine if the transaction should or should not proceed.

At step 7, which is optional, transaction processing computer 112 may send a message (e.g., the authorization request message), containing the token (or account information obtained by exchanging the token) and the TAC to transport computer 116, or any other suitable party (e.g., authorizing entity computer 118, etc.). Transport computer 116 (or another suitable party such as authorizing entity computer 118) may be configured to validate the transaction by validating the token provided using the TAC. The validation of the token using the TAC may provide assurance to the validating party that the token can be processed in the transaction. The transport computer 116 may extract user exclusive data from the TAC if it has or can obtain the appropriate cryptographic key. The extracted user exclusive data may be used for any suitable purpose including fraud checking, providing customer exclusive services, etc. In some embodiments, the transport computer 116 may be located between the transaction processing computer 112 and the resource provider computer 108 (in an operational sense).

At step 8, transaction processing computer 112 may send the message (e.g., an authorization request message) to authorizing entity computer 118 for approval. Prior to doing so, the transaction processing computer 112 may have obtained the real credentials (e.g., a PAN) associated with the token and the real credentials may be forwarded to the authorizing entity computer 118 in a modified message (e.g., a modified authorization request message). The message may include the TAC. If so, authorizing entity computer 118 may be configured to extract user exclusive data from the TAC using an appropriate cryptographic key. The extracted user exclusive data may be used for any suitable purpose. The authorizing entity computer 118 may either approve or decline the request.

At step 9, a response message (e.g., an authorization response message) may be generated by authorizing entity computer 118 and may be sent back to resource provider computer 108 (e.g., via transaction processing computer 112, transport computer 116, or any suitable path). The response message may be processed by the same entities that processed the original message (e.g., the authorization request message), and any of the entities along the channel of communication may perform a set of actions on the response message. For example, token provider computer 114 may be utilized to replace account information (e.g., a PAN) within the response message with a token so that the resource provider computer 108 does not have access to any sensitive data belonging to user 102.

At the end of the day or at any other suitable period of time after the authorization response message is received by the resource provider computer 108, a clearing and settlement process may be performed between transport computer 116, transaction processing computer 112, and authorizing entity computer 118.

Figure 2:
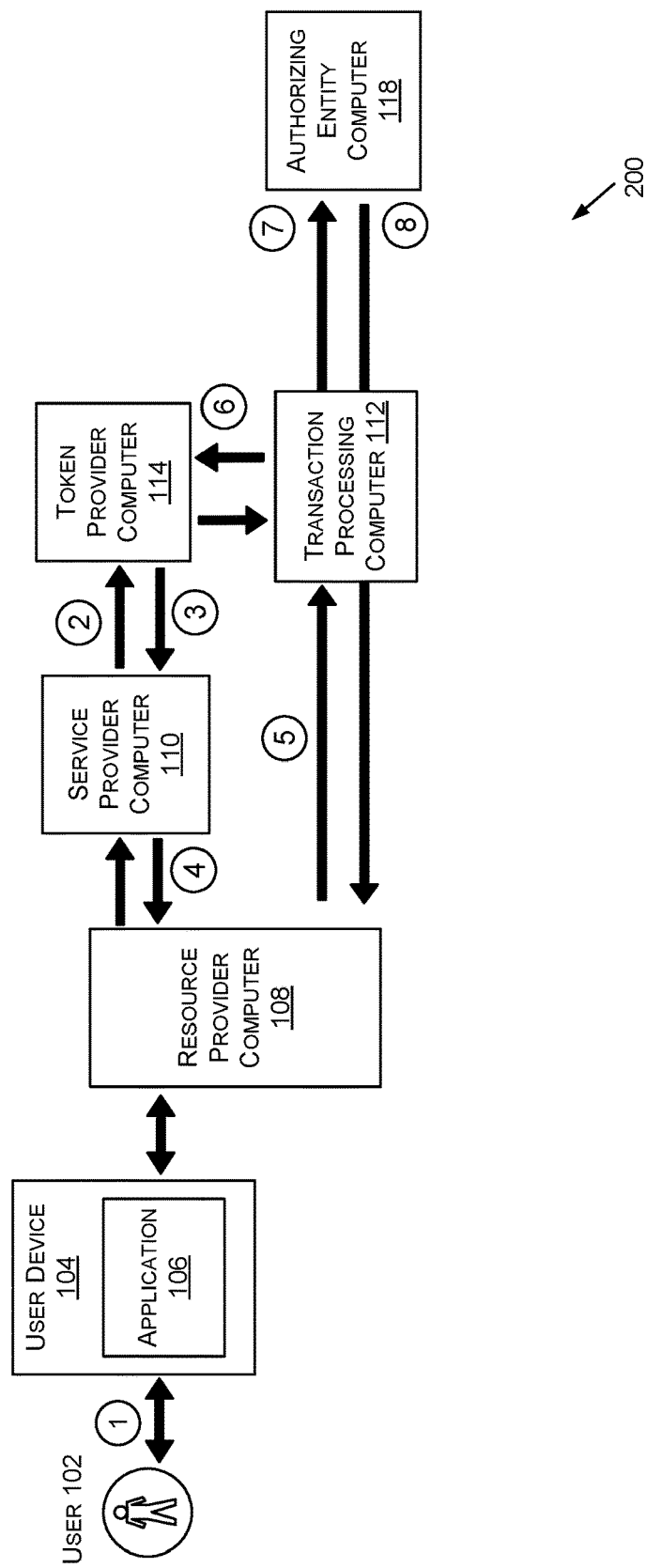
FIG. 2 shows a block diagram of a system for performing a transaction using a communication device in which a service provider computer requests a token authentication cryptogram from a token provider computer according to an embodiment of the invention.

FIG. 2 shows a block diagram of a system 200 for performing a transaction using a communication device (e.g., user device 104) in which a service provider computer (e.g., service provider computer 110) requests a TAC from a token provider computer (e.g., token provider computer 114) according to an embodiment of the invention. FIG. 2 shows user 102, who wishes to conduct a transaction (e.g., a payment transaction) using his or her user device 104 (an example of a communications device). The user device 104 may be a smart phone and the user 102 may wish to conduct the transaction remotely, i.e. from a location that is not within a resource provider's store. In other embodiments, the user device 104 does not need to be remote from the resource provider and the user device 104 can be used to conduct card present types of transactions.

At step 1, user 102 may select one or more items he or she wishes to procure using application 106 stored on the memory of the user device 104. The user 102 may authenticate himself or herself to service provider computer 110 for payment (e.g., with a password or PIN).

At step 2, the service provider computer 110 may send a request for a token and/or TAC to token provider computer 114 (e.g., via a token request message). The request may contain a token that may be used in a transaction or may contain a provisioned token requestor ID that may be used to request a token and/or TAC from token provider computer 114. The request may also contain information from service provider computer 110 defining particular user exclusive data that should be embedded in the generated TAC by the token provider computer 114.

At step 3, token provider computer 114 may authenticate the request received from service provider computer 110 and generate the token (if requested) and/or the requested TAC embedded with customer exclusive data provided by service provider computer 110. The generated token and/or TAC may be transmitted by the token provider computer 114 to the service provider computer 110. The token provider computer 114 may maintain an association between the token and the TAC generated. At step 4, service provider computer 110 may forward the token and/or the TAC to the application 106.

At step 5, application 106 may package the token and the TAC into a message (e.g., an authorization request message) and send the message to transaction processing computer 112. The application 106 may perform these functions by communicating with a resource provider computer 108 (e.g., a merchant computer within the merchant's store, a merchant computer hosting application 106), or may perform these functions on its own. Accordingly, packaging of the token and TAC into an authorization request message may be performed by the application 106 and/or the resource provider computer 108.

At step 6, transaction processing computer 112 may receive the message (e.g., the authorization request message) containing the token and TAC and may send the message to token provider computer 114. Token provider computer 114 may extract the token and exchange the token with actual payment account information belonging to user 102 so that the transaction may be processed.

At step 7, transaction processing computer 112 may validate the token with the TAC, extract the user exclusive data using an appropriate cryptographic key, and forward the results (e.g., via an authorization request message) to authorizing entity computer 118 for approval. In some embodiments, transaction processing computer 112 may additionally, or alternatively, obtain real credentials associated with the token (e.g., from the token provider computer 114) and may send those to authorizing entity computer 118 instead of the token.

At step 8, the authorizing entity may either approve or deny the request. A response message (e.g., an authorization response message) may be generated by authorizing entity computer 118 and sent back to the resource provider computer 108 via transaction processing computer 112. The response message may be processed by the same entities that processed the original message (e.g., the authorization request message), and any of the entities along the channel of communication may perform a set of actions on the response message. For example, token provider computer 114 may be configured to replace sensitive data (e.g., a PAN) within the response message with the corresponding token so that the resource provider does not have access to any sensitive data belonging to user 102.

At the end of the day or at any other suitable period of time after the response message is received by the resource provider computer 108, a clearing and settlement process may be performed (e.g., by transaction processing computer 112 and authorizing entity computer 118).

Figure 3:
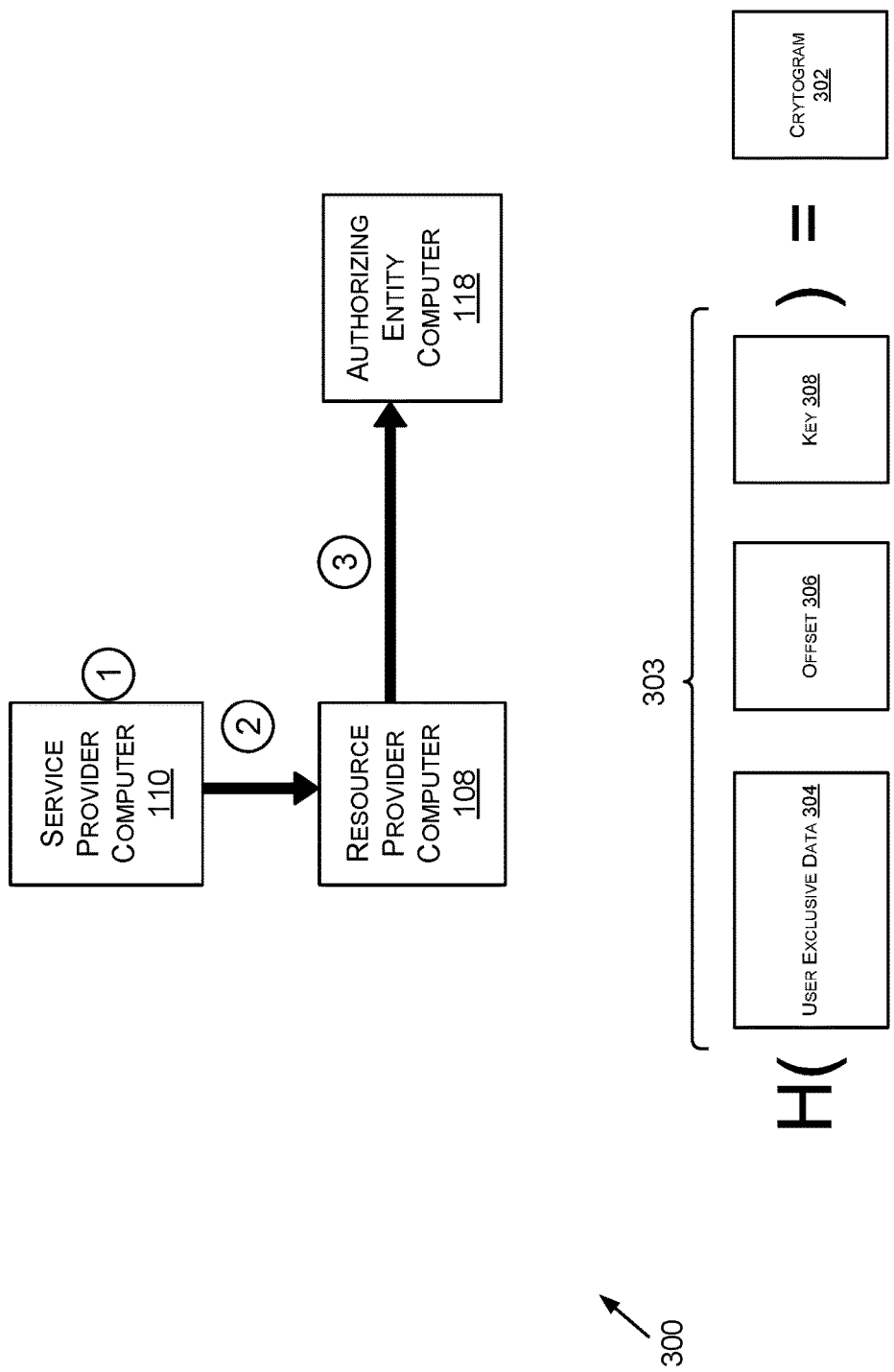
FIG. 3 shows a block diagram of another system that utilizes user exclusive data to generate a token authentication cryptogram according to an embodiment of the invention.

FIG. 3 shows a block diagram of another system 300 that utilizes user exclusive data to generate a token authentication cryptogram (e.g., cryptogram 302) according to an embodiment of the invention.

At step 1, a service provider computer 110 (or computer operated by service provider computer 110) may generate cryptogram 302 (e.g., a TAC) from transaction data 303. As a non-limiting example, a TAC may be generated by using an encryption algorithm (e.g., algorithm H). Transaction data 303 may include user exclusive data 304, a predefined offset value (e.g., offset 306), and a key 308 (e.g., a symmetric key associated with user 102 of FIG. 1) as input in order to generate cryptogram 302 as output.

At step 2, service provider computer 110 may be configured to transmit the TAC to resource provider computer 108.

In some embodiments, resource provider computer 108 may be configured to forward the TAC to another computer/entity (e.g., user device 104).

At step 3, upon receipt of a transaction request (e.g., from application 106), the resource provider computer 108 may be configured to generate/modify an authorization request message to include a token (or account information associated with the token), and the generated TAC. The resource provider computer 108 may be configured to transmit the authorization request message to another computer/entity (e.g., a transport computer, transaction processing computer, token provider computer, authorizing entity computer, or any suitable combination of the above). Once the authorization request message is received (e.g., by authorizing entity computer 118), the user exclusive data (e.g., a merchant store name) may be extracted from the TAC. The receiving computer (e.g., authorization entity computer 118), may be configured to process the transaction accordingly. In some examples, the extracted user exclusive data may be utilized in a process for detecting fraud. For example, user exclusive data can include a user's name, phone number, and other information pertaining to the user. This information may be used by the authorizing entity computer 118 determine if the user exclusive data matches other data about the user in its possession. User exclusive data provided by a service provider can be useful to the authorizing entity computer 118, as well as any other secure transaction processing entity to perform any suitable function including fraud detection or the delivery of additional services to the user.

FIG. 4 shows exemplary data elements 402 that may be used (e.g., by the service provider computer 110 and/or the token provider computer 114 of FIG. 1) to create a TAC, as well as an algorithm 400 that can be used to create the TAC. Additional descriptions of some of the data elements can be found in the following published U.S. Patent Applications, which are herein incorporated by reference in their entirety: US 20150052064; US 20150088756; US 20150324736; and US 20150180836.

In some embodiments, data elements 402 may include, but are not limited to an application transaction counter, a token requestor ID, an ECI indicator indicating a transaction type, a local card verification method, an automatic transaction number (e.g., an unpredictable number), any suitable form of user exclusive data, or any suitable combination of the above.

Referring to the algorithm 400 in FIG. 4, a master derivation key (MDK) 404 (e.g., issued by service provider computer 110 or token provider computer 114 of FIG. 1) may be used with a data encryption standard (DES) algorithm 406 (e.g., a triple DES algorithm) to encrypt data 408. In some embodiments, data 408 may include a concatenated value of a token and an inverse of the token. The resultant value (an encrypted value corresponding to data 408) may be used with a unique derived key (UDK) 410 (a same or different key issued by service provider computer 110 or token provider computer 114) and a DES algorithm 412 (a same or different DES algorithm triple DES algorithm 406) to encrypt transaction data 414. The transaction data 414 may include, but is not limited to, one or more of data elements 402. The outputted encrypted value may include cryptogram 416 (e.g., a TAC). In some cases, a portion of the encrypted value may form the cryptogram 416.

The cryptogram 416 has a number of special properties and provides for a number of advantages. For example, can serve multiple functions while providing transaction security. For instance, as noted above, the cryptogram may serve to indicate to a payment processing computer (e.g., the authorizing entity computer or processing network computer) that a token is being used in its pre-designated and predefined manner. In addition, the cryptogram can encode user exclusive data which can be extracted by the payment processing computer, and used for various purposes. Third, as illustrated by the algorithm, it is dynamic in nature and is derivable by any payment processing computer that has the appropriate keys. Even if a man-in-the-middle obtains the cryptogram in an unauthorized manner, it is of limited value. Thus, the cryptogram according to embodiments of the invention serves multiple functions, thereby reducing the need for additional data transmissions and data processing that would otherwise be needed to achieve the same level of functionality.

Figure 5:
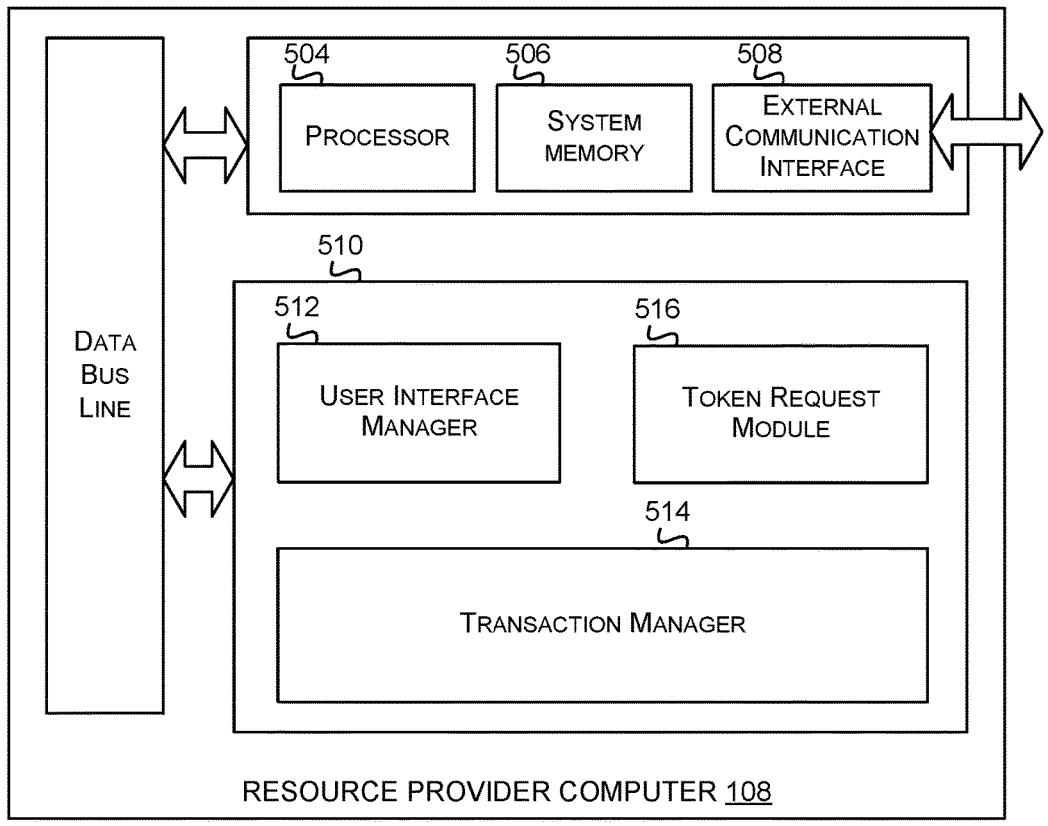
FIG. 5 shows a block diagram of a resource provider computer according to an embodiment of the invention.

FIG. 5 shows a block diagram 500 of a resource provider computer (e.g., resource provider computer 108 of FIG. 1) according to an embodiment of the invention.

The resource provider computer 108 may comprise a processor 504, which may be coupled to a system memory 506 and an external communication interface 508. A computer readable medium 510 may also be operatively coupled to the processor 504.

The computer readable medium 510 may comprise a number of software modules including a user interface manager 512, a transaction manager 514, and a token request module 516. Although these various modules are depicted as being internal to the resource provider computer 108, any number of these modules may instead be implemented as separate systems external to the resource provider computer 108.

In at least one embodiment, the user interface manager 512 may comprise code that, when executed, causes the processor 504 to provide one or more user interfaces. Such user interfaces may be provided to an application (e.g., application 106 of FIG. 1) and/or such user interface may be provided via a website hosted by the resource provider computer 108. As a non-limiting example, the user interface manager 512 may be configured to cause various interfaces corresponding to offering and/or procuring items from a resource provider (e.g., a merchant) to be provided to a user (e.g., via a user device). By way of example, the user interface manager 512 may be configured to cause the processor 504 to present information related to an item offered for sale at a merchant's website. By utilizing the interface provided, a user (operating a user device such as user device 104 of FIG. 1) may select an item for purchase and may initiate a transaction (e.g., a payment transaction).

In at least one embodiment, transaction manager 514 may be configured to cause the processor 504 to receive transaction data from a user device (e.g., the user device 104 of FIG. 1). The transaction data may include, but is not limited to, any suitable combination of data elements 402 of FIG. 4. By way of example only, the transaction data may include an item identifier, a transaction amount, an application transaction counter, a user and/or wallet ID, a token requestor ID, a token, an e-commerce indicator (ECI) indicating that the transaction is an e-commerce transaction, user exclusive data (e.g., the user's name and address, a merchant name/address, etc.), or any suitable combination of the above. Upon receipt of the transaction data, or at another suitable time, the processor 504 may be configured to execute code associated with the token request module 516.

In some embodiments, the token request module 516 may be configured to cause the processor 504 to generate a message (e.g., a token request message) that requests a TAC to be generated. The token request module 516 may be configured to cause the processor 504 to receive messages (e.g., token response messages including a TAC) and forward at least a portion of the data (e.g., a received TAC) to a user device. In some embodiments, the forwarded data may be provided by the processor 504 to the user device 104 via an application (e.g., application 106) and/or interface provided utilizing the code included in user interface manager 512. In at least some embodiments, the token request module 516 may be configured to cause the processor 504 to store at least a portion of the received data (e.g., the TAC) in system memory 506 or another suitable storage location internal or external to the resource provider computer 108.

In some embodiments, the transaction manager 514 may be configured to cause the processor 504 to generate and/or modify a message (e.g., an authorization request message) that includes a token and the received TAC. The transaction manager 514 may be further configured to cause the processor 504 to receive messages (e.g., authorization response messages) and forward at least a portion of the data included in such messages to a user device (e.g., user device 104). In some embodiments, the forwarded data may be provided by the processor 504 to the user device via an application and/or interface provided utilizing the code of user interface manager 512.

Figure 6:
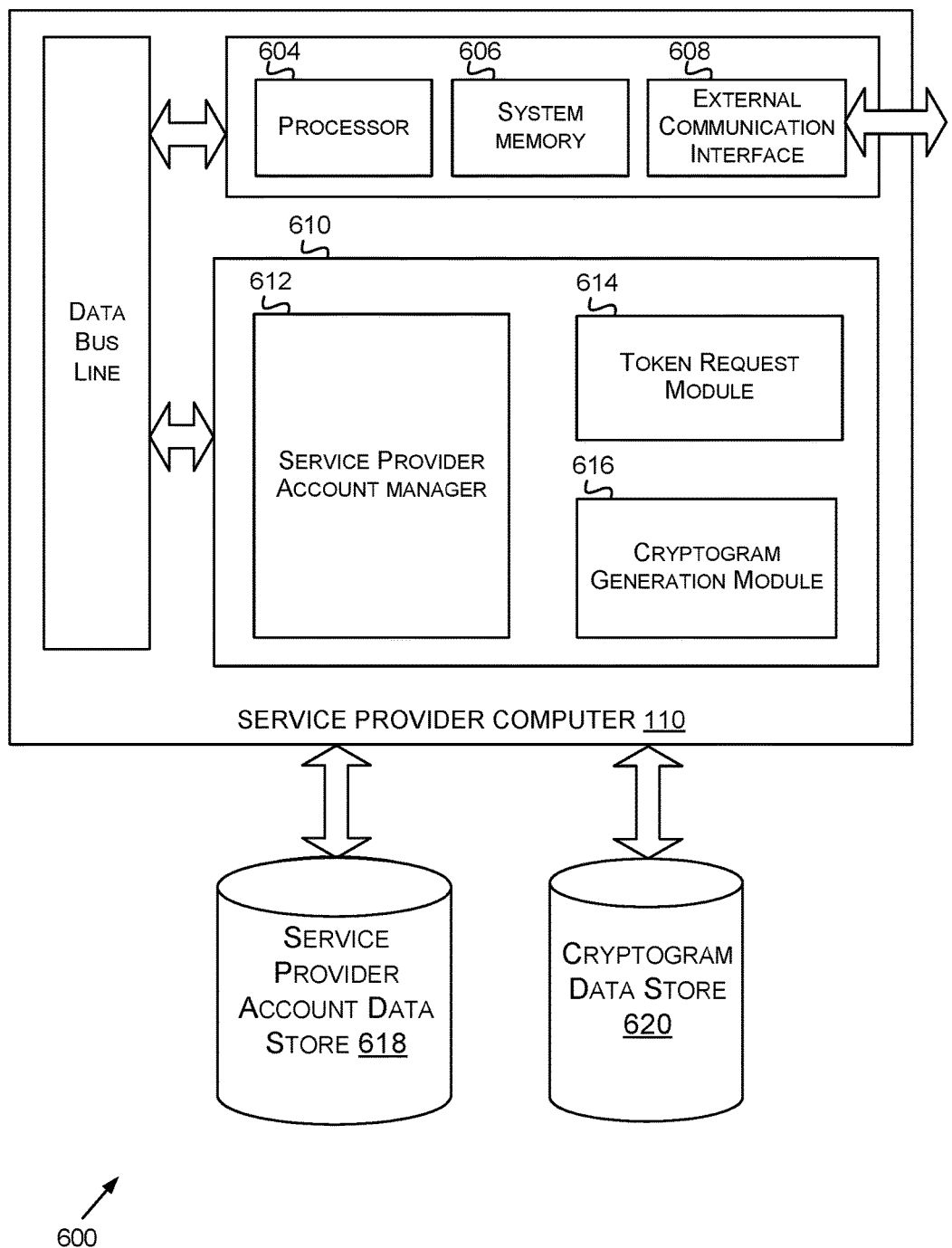
FIG. 6 shows a block diagram of a service provider computer according to an embodiment of the invention.

FIG. 6 shows a block diagram 600 of a service provider computer (e.g., service provider computer 110 of FIG. 1) according to an embodiment of the invention. The service provider computer may be a wallet provider computer that holds accounts or account data for a plurality of payment instruments of a user.

The service provider computer 110 may comprise a processor 604, which may be coupled to a system memory 606 and an external communication interface 608. A computer readable medium 610 may also be operatively coupled to the processor 604. Computer readable medium 610 may also comprise code for implementing the methods discussed herein.

The computer readable medium 610 may comprise a number of software modules including a service provider account manager 612, a token request module 614, and a cryptogram generation module 616. Although these various modules are depicted as being internal to the service provider computer 110, any number of these modules may instead be implemented as separate systems external to the service provider computer 110.

In at least one embodiment, the service provider account manager 612 may comprise code that, when executed, causes the processor 604 to provide one or more user interfaces for managing a service provider account (e.g., a digital wallet account) on behalf of a user. Such user interfaces may be utilized to collect user account information (e.g., account numbers, PANs, etc.). As a non-limiting example, the service provider account manager 612 may be configured to cause processor 604 to present information associated with a service provider account (e.g., a digital wallet account) on a user device (e.g., the user device 104) via a website or application hosted by the service provider computer 110. In some embodiments, service provider account manager 612 may be configured to cause the processor 604 to store a token (e.g., generated by the token provider computer 114) as an association to a service provider account (e.g., a digital wallet account). In some embodiments, information related to the service provider account associated with a user, including the association to a token, may be stored in the service provider account data store 618.

In at least one embodiment, token request module 614 may be configured to cause the processor 604 to receive a token request message from a user device (e.g., the user device 104 of FIG. 1), a resource provider computer (e.g., the resource provider computer 108 of FIG. 1), or any suitable entity. The token request message may include a token and/or transaction data including any suitable combination of data elements 402 of FIG. 4. By way of example, the token request message may include a transaction amount, a token request ID, a token, an e-commerce indicator (ECI) indicating that the transaction is an e-commerce transaction, user exclusive data (e.g., the user's name and address, a merchant name/address, etc.), or any suitable combination of the above. Upon receipt of the token request message, or at another suitable time, the processor 604 may be configured to forward the token request message to token provider computer 114 of FIG. 1.

In some embodiments, the token request module 614 may be configured to cause the processor 604 to receive a token and transaction data and generate a message (e.g., a token request message) that requests a TAC from another entity (e.g., token provider computer 114).

In some embodiments, the token request module 614 may be configured to cause the processor 604 to receive a response message (e.g., a token response message) and forward at least a portion of the data (e.g., a cryptogram such as a TAC) to a user device (e.g., user device 104) and/or a resource provider computer (e.g., resource provider computer 108). In at least some embodiments, the token request module 614 may be configured to cause the processor 604 to store at least a portion of the received data (e.g., the cryptogram/TAG) in cryptogram data store 620. Alternatively, at least a portion of the received data may be stored in the service provider account data store 618 as an association with a service provider account.

In some embodiments, cryptogram generation module 616 may be configured to cause the processor 604 generate a cryptogram (e.g., a TAC) in response to a token request message. In one embodiment, the cryptogram generation module 616 may cause the processor 604 to receive a token request message (e.g., a message including a token, user exclusive data, etc.). Cryptogram generation module 716 may be configured to cause the processor 604 to generate a TAC using the token and/or user exclusive data. For example, the processor 604 may execute an algorithm such as the one discussed in connection with FIG. 5 to generate a cryptogram (e.g., a TAC). The cryptogram generation module 616 may be configured to cause to the processor 604 to generate a token response message including the generated cryptogram (e.g., the TAC). The cryptogram data store 620 may be utilized by the processor 604 to maintain a correlation (e.g., a mapping) between a token and/or user exclusive data and the generated cryptogram. In some embodiments, if a cryptogram cannot be generated, a token response message may be generated and transmitted by the processor 604 to the token requestor indicating a reason the cryptogram could not be generated. In some embodiments, the generated cryptogram may be stored in the service provider account data store 618 as an association with a service provider account.

Figure 7:
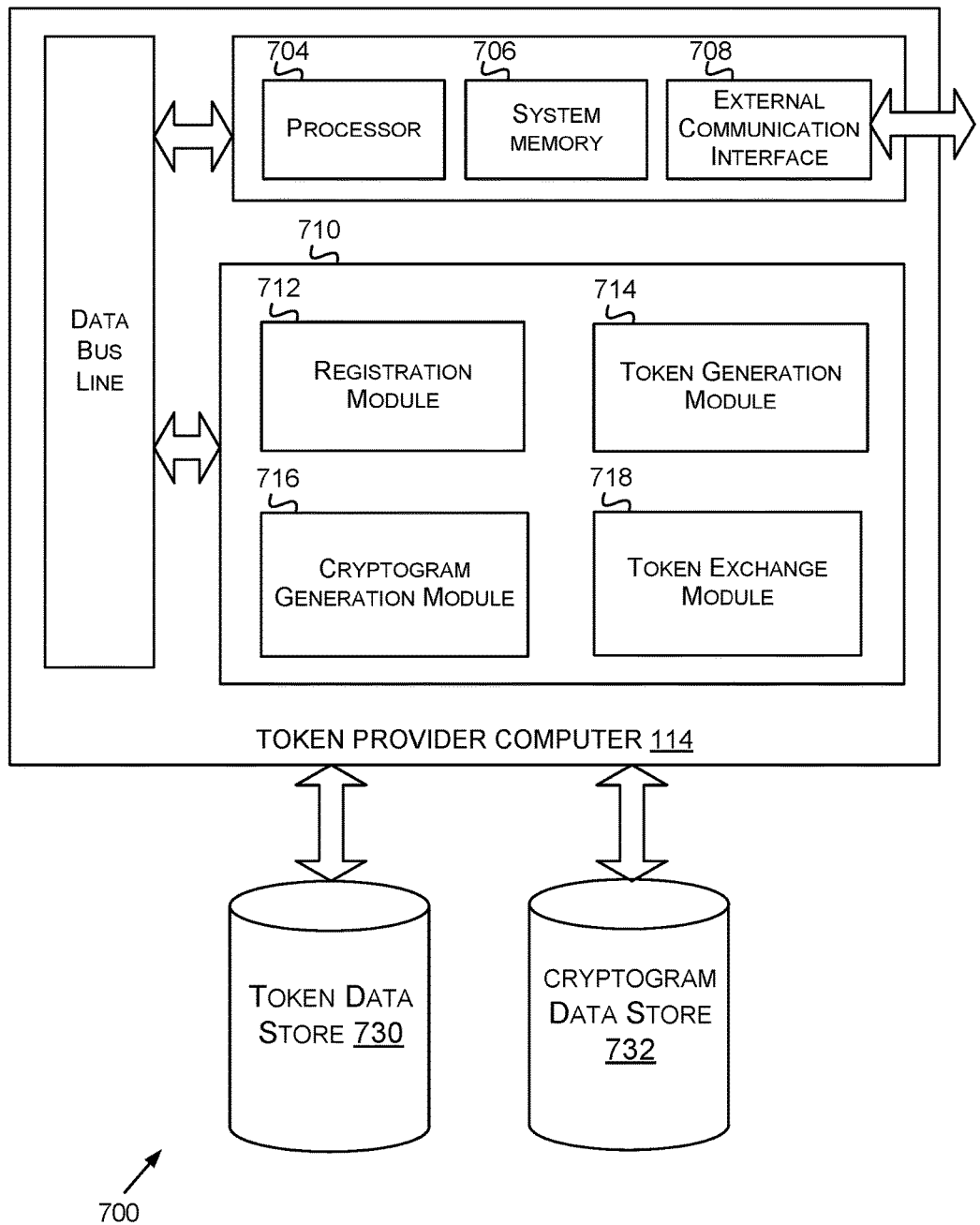
FIG. 7 shows a block diagram of a token provider computer according to an embodiment of the invention.

FIG. 7 shows a block diagram 700 of a token provider computer (e.g., token provider computer 114 of FIG. 1) according to an embodiment of the invention.

The token provider computer 114 may comprise a processor 704, which may be coupled to a system memory 706 and an external communication interface 708. A computer readable medium 710 may also be operatively coupled to the processor 704. Computer readable medium 710 may also comprise code for implementing the methods discussed herein.

The computer readable medium 710 may comprise a number of software modules including a registration module 712, a token generation module 714, a cryptogram generation module 716, and a token exchange module. Although these various modules are depicted as being internal to the token provider computer 114, any number of these modules may instead be implemented as separate systems external to the token provider computer 114.

The registration module 712 may comprise code which can cause the processor 704 to register a token requestor entity with a token data store 730 and to generate a token requestor identifier for the registered entity. Some non-limiting examples of the token requestor entities may include authorizing entities (e.g., issuers), service providers (e.g., digital wallet providers), resource providers (e.g., merchants, e-commerce merchants, transit authorities, etc.), transaction processors (e.g., payment processing networks), transport providers (e.g., acquirers), mobile devices (e.g., user devices such as user device 104), or subcomponents and applications thereof.

The registration module 712 may be configured to cause the processor 704 to receive registration information such as an entity name, contact information, an entity type (e.g., user, resource provider, service provider, transaction processor, authorizing entity, transport entity, etc.), and any other relevant information for token generation processing. In some examples, registration module 712 may be configured to cause the processor 704 to provide one or more interfaces for collecting registration information. Such interfaces may be provided by the processor 704 and rendered via an application and/or website managed by the processor 704 as part of the functionality of registration module 712. In some embodiments, the registration module 712 may cause the processor 704 to validate the information and store the token requestor details in the token data store 730. The registration module 712 may also generate a token requestor ID after successful registration. In some embodiments, the token requestor ID may be a ten digit numerical value. However, other formats of the token requestor identifier are possible.

The token generation module 714 may be configured to cause the processor 704 generate a token in response to a token request message from a token requestor (e.g., user device 104). In one embodiment, the token generation module 714 may cause the processor 704 to receive a token request message (e.g., a message including a token requestor ID, an account number (e.g., PAN), an expiration date, a CVV2, etc.). In some embodiments, the token generation module 714 may cause the processor 704 to validate the token requestor ID and generate a token for the account number. In one embodiment, the token generation module 714 may cause the processor 704 to generate a token response message including the generated token. The token data store 730 may be utilized by the processor 704 to maintain a correlation (e.g., a mapping) between an account number, a token requestor ID, and a token. In one embodiment, the token generation module 714 may determine if a token already exists in the token data store 730 for the account number associated with the token requestor ID before generating a new token. In some embodiments, if a token cannot be generated, a token response message may be transmitted by the processor 704 to the requestor indicating a reason the token cannot be generated.

The cryptogram generation module 716 may be configured to cause the processor 704 generate a cryptogram (e.g., a TAC) in response to a token request message from a token requestor. In one embodiment, the cryptogram generation module 716 may cause the processor 704 to receive a token request message (e.g., a message including a token requestor ID, a token, user exclusive data, etc.). In some embodiments, the token may be obtained from the token generation module 714 or retrieved from the token data store 730 rather than being received via a token request message.

In some embodiments, the cryptogram generation module 716 may be configured to cause the processor 704 to generate a TAC using the token and the received user exclusive data. For example, the processor 704 may execute an algorithm such as the one discussed in connection with FIG. 5 to generate a cryptogram (e.g., a TAC). The cryptogram generation module 716 may be configured to cause the processor 704 to generate a token response message including the generated cryptogram. In The cryptogram data store 732 may be utilized by the processor 704 to maintain a correlation (e.g., a mapping) between a token requestor ID, user exclusive data, a token, a cryptogram (e.g., a TAC), or any suitable combination of the above. In some embodiments, if a cryptogram cannot be generated, the token response message may be transmitted by the processor 704 to the token requestor indicating a reason the cryptogram could not be generated.

In some embodiments, a token and TAC may be generated/provisioned as a result of a single token request message. In still further embodiments, a token and a TAC may be maintained in a single data store in a common record/association. For example, instead of separate mappings, a single mapping including account information, a token, a TAC, and a token requestor ID may be maintained by the processor 704. In some embodiments, registration, token generation, and cryptogram generation, or any suitable combination of the above may be performed as part of processing a single token request message.

The token exchange module 718 may comprise code, executable by the processor 704, to cause the processor 704 to allow registered entities to request account information (e.g., a PAN) for a given token. For example, the transaction processing computer 112 of FIG. 1, may issue a request for a token exchange during a payment transaction. In one embodiment, a registered entity can provide a token requestor ID, a token, or any suitable information to request the account information. The token exchange module 718 may validate that the requesting entity is entitled to make a request for a token exchange. In one embodiment, the token exchange module 718 may be configured to cause the processor to validate the account information/token mapping (e.g., a PAN to token mapping). Upon successful validation, the token exchange module 718 may be configured to cause the processor 704 to retrieve the account information and provide it to the requesting entity. In one embodiment, if the account information/token mapping is not valid, an error message may be provided.

Once received, the account information (e.g., a PAN) may be utilized by the requesting entity (e.g., transaction processing computer 112) to perform further transaction processing. For example, transaction processing computer 112 may modify or generate an authorization request message to include the account information rather than a token.

By utilizing the methods described herein, a TAC may be used to validate a token which provides assurance to a receiving entity that the transaction is being requested by an authorized entity. The methods discussed herein further provide for a TAC to be utilized to pass secure information from one entity to another entity by embedding user exclusive information within a TAC and then packaging the TAC within a message (e.g., an authorization request message). Accordingly, information that is not transmitted in conventional systems, may now be embedded/encrypted within traditional messages (e.g., authorization request/response messages) to be utilized by a receiving entity for any suitable purpose. Additionally, the methods described herein provide for a TAC that may be utilized simultaneously as both a validation tool and a secure data transmission tool and transmitted in a single message.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method of processing a transaction initiated by a communication device provisioned with a token, the method comprising:
 receiving, by a service provider computer, from an application operating on the communication device, a token request message for a token authentication cryptogram;
 generating, by the service provider computer, the token authentication cryptogram derived from user exclusive data, wherein the token authentication cryptogram is generated by encrypting at least the user exclusive data utilizing a triple data encryption algorithm; and
 sending, by the service provider computer to the application, the token authentication cryptogram, wherein the token authentication cryptogram can be used to validate the transaction, and the user exclusive data subsequently is extracted from the token authentication cryptogram during validation by a processing computer which then uses the user exclusive data for additional analysis.

2. The method of claim 1, wherein the user exclusive data comprises at least one of: a resource provider identifier, user preference information, or a user identifier.

3. The method of claim 1, wherein the token authentication cryptogram is sent to the application utilizing a token response message.

4. The method of claim 1, wherein the application is hosted by a resource provider computer.

5. The method of claim 1, wherein receipt of the token authentication cryptogram causes the application to transmit the token authentication cryptogram in an authorization request message to a transaction processing computer.

6. The method of claim 1, wherein content of the user exclusive data is specified by the service provider computer.

7. A method of processing a transaction initiated by a communication device, the method comprising:
sending, by a service provider computer, to a token provider computer, a token request message for a token authentication cryptogram, wherein the token request message comprises user exclusive data;
receiving, by the service provider computer, from the token provider computer, a token and the token authentication cryptogram, the token authentication cryptogram derived from the user exclusive data, wherein the token authentication cryptogram is generated by encrypting at least the user exclusive data utilizing a triple data encryption algorithm; and
sending, by the service provider computer to the communication device, the token and the token authentication cryptogram, wherein the token authentication cryptogram can be used to validate the transaction, and the user exclusive data is subsequently extracted from the token authentication cryptogram during validation by a processing computer which then uses the user exclusive data for additional analysis.

8. The method of claim 7, wherein the user exclusive data comprises at least one of: a resource provider identifier, user preference information, or a user identifier.

9. The method of claim 7, wherein the token and the token authentication cryptogram is sent to the communication device utilizing a token response message.

10. The method of claim 7, wherein the token and the token authentication cryptogram is sent to an application operating on the communication device.

11. The method of claim 10, wherein the application is hosted by a resource provider computer.

12. The method of claim 11, wherein receipt of the token authentication cryptogram causes the application to transmit the token authentication cryptogram in an authorization request message to a transaction processing computer.

13. The method of claim 7, wherein content of the user exclusive data is specified by the service provider computer.

14. A service provider computer comprising,
a processor, and
a computer readable medium coupled to the processor, the computer readable medium comprising code for causing the processor to perform operations comprising:
sending, to a server computer, a request for a token authentication cryptogram, wherein the request comprises user exclusive data;
receiving, from the server computer, a token and the token authentication cryptogram derived from the user exclusive data, wherein the token authentication cryptogram is generated by encrypting at least the user exclusive data utilizing a triple data encryption algorithm; and
sending, to an application operating on a user device, the token and the token authentication cryptogram with transaction data, wherein the token authentication cryptogram can be used to validate the transaction data, and the user exclusive data is subsequently extracted from the token authentication cryptogram during validation by a processing computer when then uses the user exclusive data for additional analysis.

15. The service provider computer of claim 14, wherein the user exclusive data comprises at least one of: a resource provider identifier, user preference information, or a user identifier.

16. The service provider computer of claim 14, wherein the token authentication cryptogram is requested utilizing a token request message.

17. The service provider computer of claim 14, wherein the token authentication cryptogram is sent to the application in a token response message.

18. The method of claim 1, wherein the token authentication cryptogram further encrypts the token and a transaction type indicator.

19. The method of claim 1, further comprising:
receiving, by the processing computer, an authorization request message comprising the token and the token authentication cryptogram;
extracting, by the processing computer, the user exclusive data; and
performing, by the processing computer, the additional analysis on the user exclusive data.

20. The method of claim 1, wherein the additional analysis comprises performing a fraud analysis on the user exclusive data.

* * * * *